INVENTOR
Helmar Svenson

Patented Dec. 5, 1950

2,533,152

UNITED STATES PATENT OFFICE 2,533,152

FISHHOOK EXTRACTOR

Helmar Svenson, Milwaukee, Wis.

Application April 23, 1947, Serial No. 743,421

2 Claims. (Cl. 43—53.5)

This invention relates to improvements in fishhook extractors, and more particularly to a novel fishhook extractor of the formed wire type.

An object of the invention is to provide a simple and inexpensive device of the type including a member which may be guided down a fish line interiorly of a fish to release a hook and including integral means for guarding the hook during its removal with the device from the inside of the fish.

Other and further objects of the invention will appear as the description proceeds, reference being had to the accompanying drawing, in which.

Figure 1:
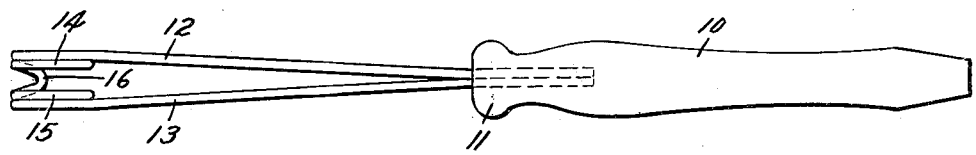
Fig. 1 is a top plan view in elevation of a fishhook extractor embodying the invention.
Figure 2:
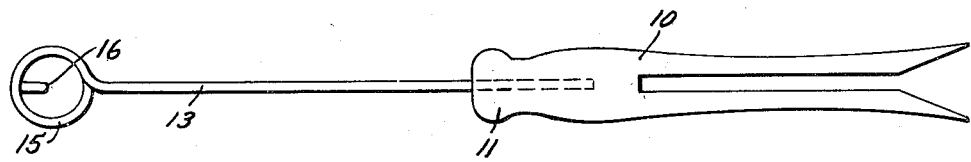
Fig. 2 is a side view in elevation of the device shown in Fig. 1.
Figure 3:
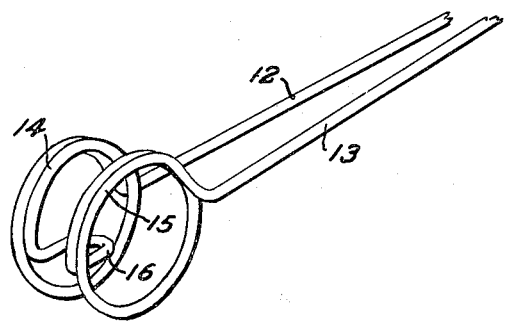
Fig. 3 is a perspective fragmentary view of the wire portion of the device.

Referring more particularly to the drawing, the numeral 10 refers to a conventional wood clothespin-like handle member, which has embedded in its head end 11, the parallel shank portions 12 and 13 each having at their outer ends, two one and one-half circular parallel bends 14 and 15 terminating in a radial inward loop 16, all integral with said shank portions 12 and 13 which latter are substantially aligned with said handle member 10.

In use, to disgorge a fishhook impaled interiorly of a fish, the fish line is held taut in one hand and the handle member 10 is grasped in the other hand and the loop 16 is engaged in the fish line and forced inwardly of the fish until the loop impinges against the bend of the hook, whereupon a pressure exerted thereagainst will release the hook from the fish after which the said hook may be withdrawn protected by the circular parallel bends 14 and 15 against snagging of the hook within the fish during withdrawal.

It will be understood that the device is capable of many modifications in structure and design, without departing from the spirit of the invention, within the scope of the appended claims.

Having thus described the invention, what is claimed and desired to be secured by Letters Patent of the United States, is:

1. A fishhook disgorger comprising a handle member, a wire element formed for a portion of its length into a pair of parallel shanks embedded in the end of said handle and aligned therewith, the free end of the wire element formed into two parallel circular bends terminating in a loop just short of their common axis.

2. A fishhook disgorger comprising a handle member, a wire element formed for a portion of its length from its ends into a pair of parallel shanks partially embedded in the end of said handle, the free portion of the wire element terminating in two one and one-half circular parallel bends in turn terminating in an inward loop radial of and just short of the common axis of said circular bends.

HELMAR SVENSON.

REFERENCES CITED

The following references are of record in the file of this patent:

UNITED STATES PATENTS

| Number | Name | Date |
|---|---|---|
| 616,657 | Gaines | Dec. 27, 1898 |
| 844,182 | Pettis, Jr. | Feb. 12, 1907 |
| 1,626,333 | Fain et al. | Apr. 26, 1927 |
| 2,155,898 | Harkins | Apr. 25, 1939 |
| 2,441,458 | Underwood | May 11, 1948 |